INVENTOR:
GEORGE TIBOR SENDRO

BY: Cavanagh & Norman

INVENTOR:
GEORGE TIBOR SENDRO
BY: Cavanagh & Norman

Aug. 22, 1967  G. T. SENDRO  3,337,739
CONDITION CONTROL GALVANOMETER WITH
PHOTOELECTRIC LIMIT SENSING
Original Filed Dec. 17, 1965  4 Sheets-Sheet 3

INVENTOR:
GEORGE TIBOR SENDRO

BY: *Cavanagh & Norman*

United States Patent Office 3,337,739
Patented Aug. 22, 1967

3,337,739
CONDITION CONTROL GALVANOMETER WITH PHOTOELECTRIC LIMIT SENSING
George Tibor Sendro, Islington, Ontario, Canada, assignor, by mesne assignments, to Sigma Instruments, Inc., Braintree, Mass.
Continuation of application Ser. No. 514,505, Dec. 17, 1965. This application Jan. 13, 1967, Ser. No. 609,262
5 Claims. (Cl. 250—231)

ABSTRACT OF THE DISCLOSURE

A condition responsive apparatus is disclosed including a pointer swingable in an arcuate path along a scale in accordance with variations in a condition, and carrying a mask. An arm is mounted for movement in an arc concentric with such arcuate path, and carries a photosensitive switch comprising a light source and a photosensitive element spaced for interruption of a light beam by the mask. The arm is adjustable relative to the scale to set a scale point at which the mask will interrupt the light beam to effect a condition control operation.

---

The invention relates to a self-regulating condition control apparatus for continuously maintaining a predetermined condition level such as temperature and the like, and is a continuation of my copending application Ser. No. 514,505, filed Dec. 17, 1965, which is a continuation-in-part of my copending application Ser. No. 237,787, filed Oct. 31, 1962, now Patent No. 3,249,759, entitled, "Condition Control Galvanometer With Photoelectric Limit Sensing."

In such a control device it is generally desirable that a continuous visual reading of the temperature or like condition is provided in order that an operator may have accurate information at all times. In addition, such control devices should provide for switching off, for example, of heating coils at a predetermined high temperature and switching on at a predetermined low temperature.

Such prior control devices as have generally been available have suffered from a variety of defects such as for example inability to provide a continuous accurate reading even while the apparatus is at its predetermined limit. Further, such disadvantages include lack of sensitivity at or near the limit condition, lack of temperature compensation, insufficient damping of the fluctuations in the condition, and lack of overcorrection safeguards.

Accordingly, it is an object of the invention to provide a control apparatus for regulating a predetermined condition which is safe and reliable in operation and which is efficient and comprehensive in its function.

More specifically, it is an object of this invention to provide a control apparatus having the foregoing advantages in which a continuous visual reading of the condition is provided at all times.

More specifically, it is an object of this invention to provide a control apparatus having the foregoing advantages in which a predetermined high limit may be set while leaving the visual reading free from restriction.

More specifically, it is an object of this invention to provide a control apparatus having the foregoing advantages which is provided with means limiting and reducing the fluctuation of said condition.

More specifically, it is an object of this invention to provide a control apparatus having the foregoing advantages in which both a high limit and a low limit can be preset at varying intervals, while leaving said apparatus free to provide a continuous accurate reading at all times.

A preferred embodiment of the invention will now be described by way of example only with reference to the following drawings in which like references refer to like parts thereof throughout the various views and diagrams, and in which.

The following description of a preferred embodiment is directed to a control device for regulating heating but other applications could equally well be described without limiting the invention.

Thus, the device could be used for controlling physical conditions in a process, such conditions being heat, humidity, radiation level, both mass and volume flow, stream velocities and the like state conditions. A suitable pick-up can be used for faithfully reproducing the condition or conditions, this pick-up being connected to a suitable transducer within the device, whereby the state condition can be controlled. The transducer may be operable through electrical means or through other means such as for instance, hydraulic, pneumatic, mechanical, or other means of energy transmission.

Figure 1:
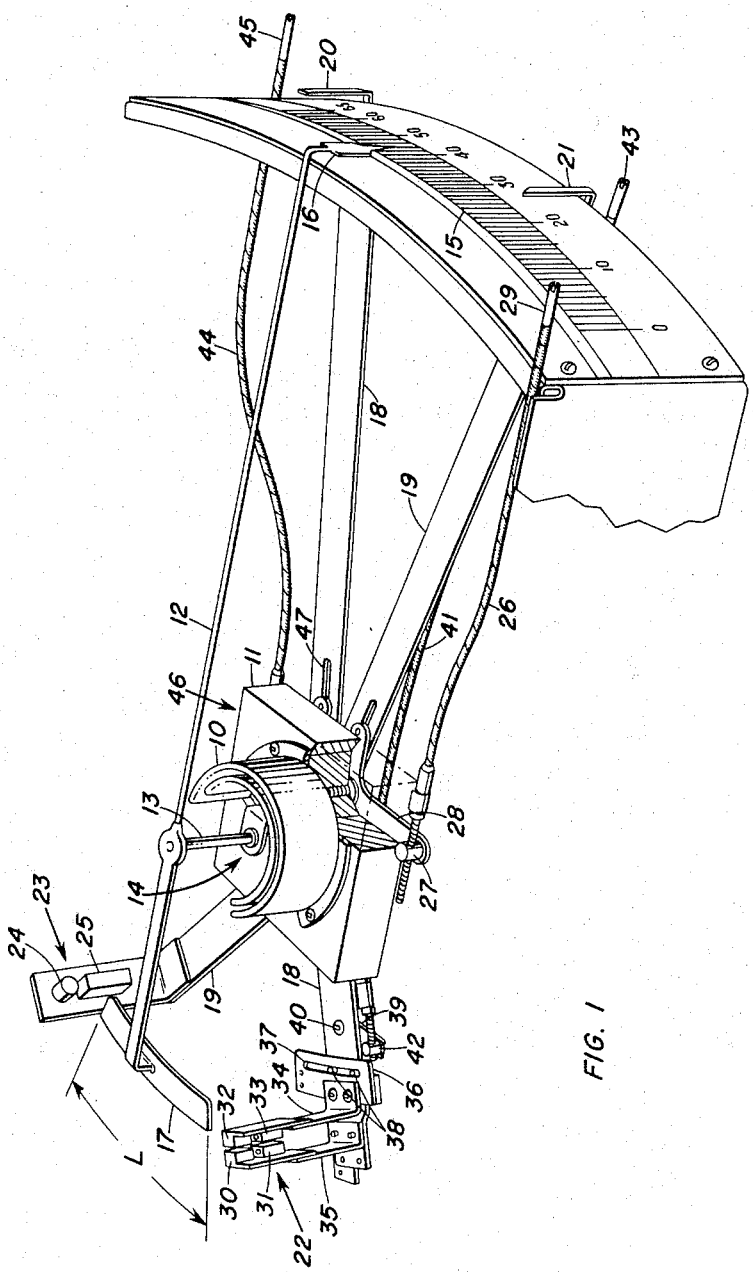
FIGURE 1 is a perspective cut away and simplified view of a control apparatus according to the invention.

From FIGURE 1 it will be seen that the preferred embodiment of the control device according to the present invention comprises an element 10 responsive to a signal from a sensing element (not shown). The element 10 is in this case a pressure sensing element and thus would normally be connected to a pressure bulb, thereby to sense the temperature of fluctuations in the controlled area. It will be understood however, that other means for sensing temperature fluctuations such as electrical can also be resorted to.

The element 10 is secured to a supporting base 11 and is provided with the pointer arm 12 mounted on the pivot shaft 13. The rack and pinion device as at 14 changes the movement of the tube element 10 to a rotational movement and causes the arm 12 to swing about the scale 15, the pointer 16 indicating the temperature reading scale. A mask or flag 17 is supported on arm 12 opposite to the pointer 16 and has an arcuate length approximating 50 percent of the total scale movement of pointer 16.

A pair of locating arms 18 and 19 are pivotally supported below the base 11, the pivot being in line with the pivot for the arm 12 and located therebelow. The arms 18 and 19 are provided with flags 20 and 21 which act as witness to the set position for limiting means built within the device.

The limiting means are indicated generally at 22 and 23, the limiting device indicated at 22 incorporating adjustable limiting means relative to the total adjustment between the sets 22 and 23. It should be understood that the differential assembly included in the limiting means 22 could also be included at the position 23 if so desired, whereby both the upper and the lower limiting position of the device could be controlled in differential form.

Limiting device 23 comprises the light source 24 and a photoelectric cell 25. These two units are wired into a circuit similar to one half of the circuit shown in FIGURE 2. The arm 19 supporting the limiting device 23 is adjustably positioned by rotation of the flexible shaft 26 threaded into the stud 27 and operating the crank 28. Rotation of the slotted head 29 will cause movement of the arm 19 about its pivot point thus adjusting the flag 21 on the scale 15 and adjusting the position of assembly 23 relative to the mask 17.

The limiting assembly 22 comprises a first light source 30 energizing a cell 31 and a second light source 32 energizing a second cell 33. The cell 33 supported on the movable arm 34 is adjustable relative to the fixed arm 35 by means of the plate 36 provided with slot 37 and supported on the pins 38. A quadrant 39 pivoted on the pin 40 is operable by means of the flexible drive 41 and threaded stud 42 to move the movable arm 34 relative to the fixed arm 35, limited by the length of the slot 37. The slotted end 43 is provided on cable 41 and extends to the front of the instrument whereby the differential setting between cells 31 and 33 can be set. In a similar manner the cable 44 is provided with the slotted end 45 and operates through another threaded stud in assembly 46 and slot 47 in arm 18 to adjust the position of the assembly 22 relative to the mask 17.

Figure 2:
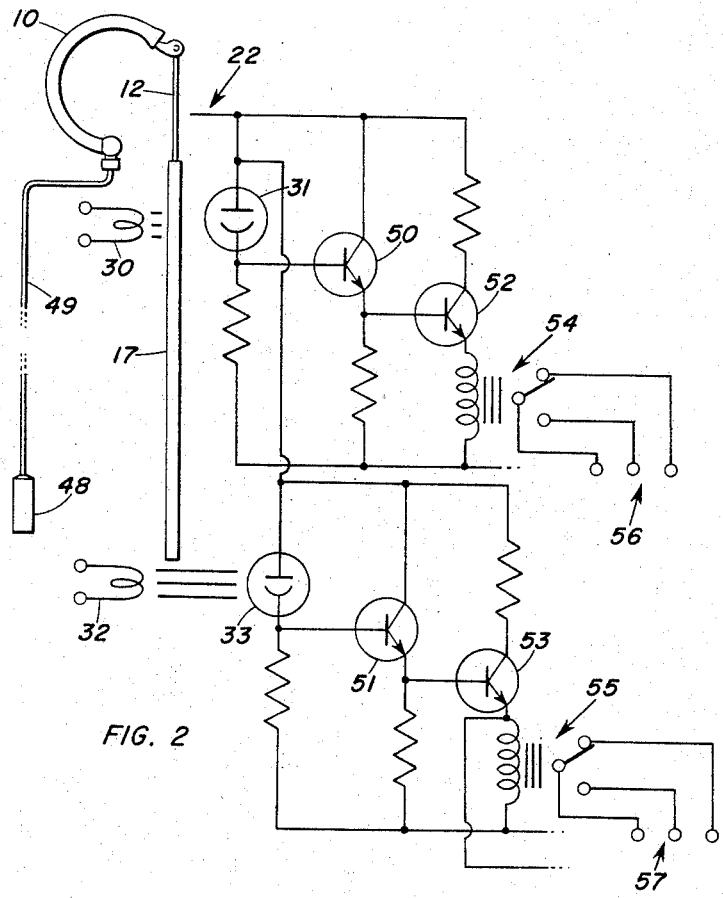
FIGURE 2 is a schematic wiring diagram showing one preferred use according to the present invention.

With reference to FIGURE 2 the schematic wiring diagram for the present device is illustrated and shows the use of the differential limiting assembly 22. The pressure unit 10 together with the remote sensing bulb 48 connected by means of the tube 49 is shown operably connected to the mask 17 on the arm 12. In the diagram the light source 30 is shown occluded by mask 17 and the light source 32 is shown about to be occluded by the mask 17. The circuits shown are a pair of amplifying circuits in parallel with the cells 31 and 33 acting to switch power to the transistors 50 and 51. The second stage is provided with transistors 52 and 53 to supply power to relays 54 and 55 respectively. These relays supply power through the terminals 56 and 57 to the actual heating elements to be controlled. It will be understood that the circuitry for the limiting assembly 23 is similar to one-half the circuitry as shown in FIGURE 2 and that additional circuitry in order to provide a modified control signal to the heaters in the aforementioned heat control process can be employed if so desired. Such additional circuitry may employ feed-back signals from the controlled equipment whereby temperature fluctuations can be sensed and controlled.

Figure 3:
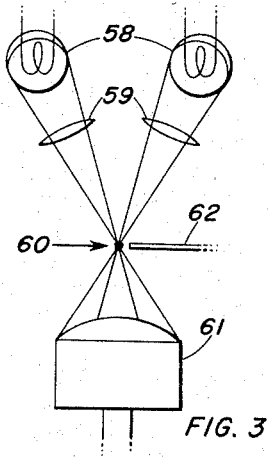

In some instances, in order to increase the sensitivity of the controlling instrument, the arrangement as shown in FIGURE 3 can be used to advantage. It will be appreciated that for any particular photosensitive device such as a photoelectric cell there is a minimum amount of light coverage required for activation. Thus for a given illumination of the photocell a certain time exists for the moving vane or mask to occlude light from the cell and thus inactivate it. The time lag involved is thus dependent upon the width of the light being necessary to activate the cell (the effective width of the cell) and thus the sensitivity of the control device is largely limited by the sensitivity of the photoelectric unit.

From FIGURE 3 it will be seen that the present invention overcomes this difficulty by providing a pair of light sources 58 focused by means of the lenses 59, through a focal point 60 and onto a photoelectric cell 61. The area of the point of focus 60 is considerably less than the total area of the photocell 61, whereby a flag or mask 62 moving through the focal point 60 will occlude cell 61 in a distance of travel considerably less than the width of the cell 61.

Figure 4:
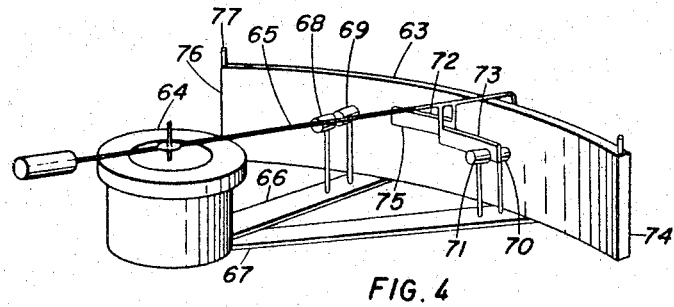

In order to control the upper and lower limits of a state condition in a particular process, the state being for instance, temperature, the arrangement as shown in FIGURE 4 can be resorted to. The control of upper and lower temperature limits over a particular temperature range requires the use of limiting means at both ends of the scale range. Heretofore, with controlling devices incorporating photosensitive limits, it has been conventional practice to provide holding relays which maintain the limit signal after the initial signal has been instigated by the photo cell, in order that the limit command, that is, an on or off signal, be maintained during the usual override period when the process equipment is heating or cooling due to latent heat within the system. Alternatively, a pair of photosensitive switches can be utilized, the first producing an off signal on a temperature rise and an on signal on a temperature decrease resulting in the necessity of two pairs of photosensitive devices in order to control both upper and lower limit settings. It will be seen that both such methods result in increased costs and complexity due to the inclusion of additional parts in order to effect the required switching over the selected range.

By resort to the embodiment as shown in FIGURE 4 the desired limit settings for a selected range can be maintained without resort to additional switching means such as for instance, holding relays and the like. By the use of a pair of masks associated with an upper limit photosensitive device and a lower limit photosensitive device effective control over the upper and lower limits over the full range of adjustment can be obtained.

The device of FIGURE 4 comprises a scale unit 63 associated with a transducer 64 having mounted thereon the pointer arm 65. The transducer 64 can be any one of several well known types of transducers which convert a signal into arcuate movement of the arm 65. A first setting arm 66 is pivotally mounted below the unit 64 and a second setting arm 67 is similarly pivoted, both arms 66 and 67 extending out to the scale 63 and provided with flags (not shown) similar to the flags 20 and 21 of FIGURE 1.

A light source 68 and a photo cell 69 are provided on the arm 66 and a similar pair of units being a photo cell 70 in association with a light source 71 are mounted on the arm 67. Both arms 66 and 67 can be adjustably positioned along the respective half length of the scale 63, the total movement of each arm 66 or 67 being the respective total adjustment over the limit setting for that particular end of the scale. Thus, considering the arm 66 to represent the high limit setting and the arm 67 to represent the low limit setting the respective high and low limits for the particular process being controlled would be set by positioning these arms.

A pair of flags or masks 72 and 73 are supported below the pointer arm 65 and are adapted to travel a path between the units of the high limit setting on arm 66 and the units for the low limit setting on the arm 67 respectively.

Each flag 72 or 73 is of an arcuate length somewhat less than the total arcuate travel of the respective arms 66 or 67. Thus, for the arm 66 being towards the centre of the scale at the lower or most central position thereof, and for the pointer arm 65 being at the lowest position towards the end 74 of the scale 63 the end 75 of the flag 72 will just clear the space between the unit 68 and 69, thereby energizing the circuit on arm 66 and maintaining the respective unit, in this case, a heater unit, in the on position. Upon a temperature rise the pointer arm will swing towards the end 76 of scale 63 and cause the flag 72 to interfere between units 68 and 69, thereby to shut the said heaters off. The arcuate length of flag 72 will ensure continuing interference between units 68 and 69 while the pointer arm moves upwardly on the scale, even to the limit set by the stop 77, which represents the upper total range of the entire instrument. Thus, at all times, regardless of how much overswing due to latent heat occurs, the device will control the heaters to the off position. In a similar manner the flag 73 will coact with the units 70 and 71 to maintain the heaters on the on position throughout the entire swing of the pointer arm 65 moving towards the end 74 of scale 63, that is towards the lower limit of the scale.

By resort to the above device means are provided for controlling a state condition over a pre-selected range, the upper and lower limits being adjustable over pre-selected ranges. The device maintains the integrity of the imposed limit by the provision of the two flags and without resort to further switching means such as for instance, additional photosensitive units and holding relays.

Figure 5:
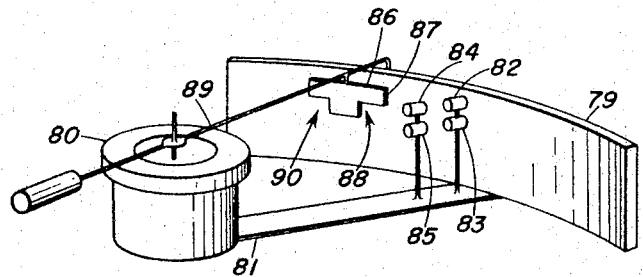

Still other particular conditions can be accommodated by resort to the arrangement as shown in FIGURE 5.

In some instances, it is preferable to control parallel circuits in predetermined steps. Whereas the device as illustrated in FIGURE 1 is suitable for certain application, notably those requiring parallel circuits which are stepped and provided with adjustment for the variation in steps, the device in FIGURE 5 provides a simple means for obtaining the steps in pre-selected degrees. This is done within the instrument by providing a specially shaped flag or mask which is adapted to switch photosensitive devices successively and with pre-set spacing.

The device comprises a scale 79 and a transducer 80 similar to that shown in FIGURE 4. A positioning arm 81 is pivotally secured to the transducer 80 and extends out to the scale 79 to be provided with an indicating flag such as the flag 20 in FIGURE 1. Arm 81 supports an upper photocell 82 and a lower photocell 83 illuminated by the lamps 84 and 85 respectively. It should be understood that while only two pairs of cells and lamps are shown, more may be utilized in order to provide more than the single step provided by this double pair. Thus, it would be possible to provide a plurality of photocells together with a plurality of lamps, the number depending upon the desired number of steps.

A flag member 86 is provided with an upper arm 87 and a cut-out at 88, the length of the arm portion 87 determining the length of the step between the switching of the cells 82 and 83.

Upon the pointer arm 89 moving under influence of the transducer 80, responsive to a signal, flag 86 will move into interference with the cells 82 and 83, the arm 87 of flag 86 first occluding cell 82 whereafter, due to the predetermined step built into the flag 86, the lower portion of flag 86 will occlude the cell 83. By providing a similar cut-out as at 90 on the opposite end of flag 86 the above sequence can be reversed as the pointer arm 89 continues to swing. Still further the method as illustrated in FIGURE 4 can be utilized in this device, whereby the length of the arm 86 is extended to cover substantially the length of arcuate movement of the arm 89 whereby the slot 90 will not be required and the switching would be reversible by an opposite swing of the arm 89 only.

Figure 6:
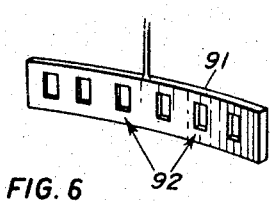

In certain processes, it is often desirable to provide a number of signals at definite intervals during the movement of a pointer arm over a dial whereby electrical counters can be utilized for the recording of information. In such cases, a single photocell with related light source can be utilized within the device and a flag or mask such as the mask 91 shown in FIGURE 6 can be utilized. In this embodiment the holes or windows as at 92 in passing by a light source will provide a number of individual signals.

Figure 7:
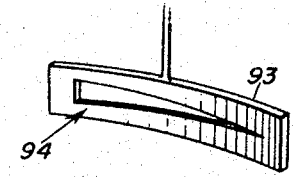
Figure 8:
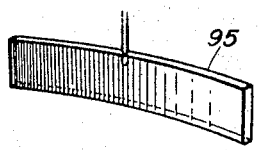

Still further modifications of the present invention are illustrated in FIGURE 7 and FIGURE 8. It is often necessary to provide a linear signal which can be used for controlling linear devices. Thus, in the control of flow valves such as for instance air valves, a linear signal is required in order to control the operating means for the valves. In order to obtain a linear output from a photodiode circuit the masks as shown in FIGURE 7 and FIGURE 8 can be used to advantage. The mask 93 shown in FIGURE 7 is provided with an elongated triangular cut-out as at 94 which while the mask is moving over the face of a photocell will mask off light to produce a linear output in the diode circuit, according to the shape of the triangular cut-out 94 in flag 93 and the movement of the flag. In a similar fashion the flag 95 shown in FIGURE 8 varies in transparency along the length thereof whereby the light passed varies so as to produce a linear output in the photodiode circuit. It should be noted that the particular circuitry required to utilize the output of these devices as described is well known in the art and for this reason is not described in detail here. The characteristics of a particular photosensitive device and diodes suitable for use therewith are readily obtained from the suppliers of such units and the particular requirements of control for a given process would be known and thus the application of this invention to the process could be ascertained by those skilled in the art.

Figure 9:
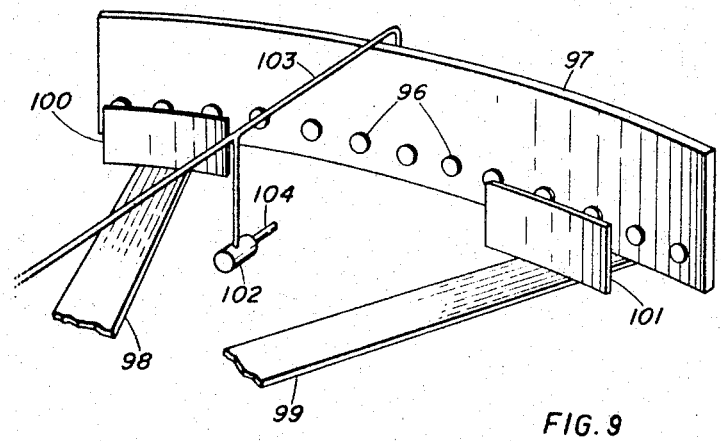

A still further method of providing multiple signals for counting purposes is shown in FIGURE 9. In this embodiment a series of photodiodes 96 are secured to the back of the scale 97 and oriented along radial axes directed towards the axes of rotation. The arms 98 and 99 carry the shields 100 and 101 respectively, and are swingable together and apart therefrom to provide adjustable masking of the photodiodes 96. A light source 102 is mounted on the indicator arm 103 and focused as by the plastic rod 104 into a narrow beam directed along the axes towards the diodes 96. In operation, the shields 100 and 101 can be swung apart to expose the photodiodes 96 over a central arc while masking those at each end of the arc or the shields can be swung into an overlapping relationship to occlude a portion of the arc in the centre thereof. In this manner, counting or stepping can be provided over any portion of the total scale 97 by suitably adjusting the shield 100 and 101. It should also be noted that in some cases, in order to reduce the weight on the pointer arm 103 the light source 102 can be replaced by a small radio active source focused upon the diodes 96. In this case, the diodes would be replaced by suitable radiation sensitive semi-conductor junctions.

Figure 10:
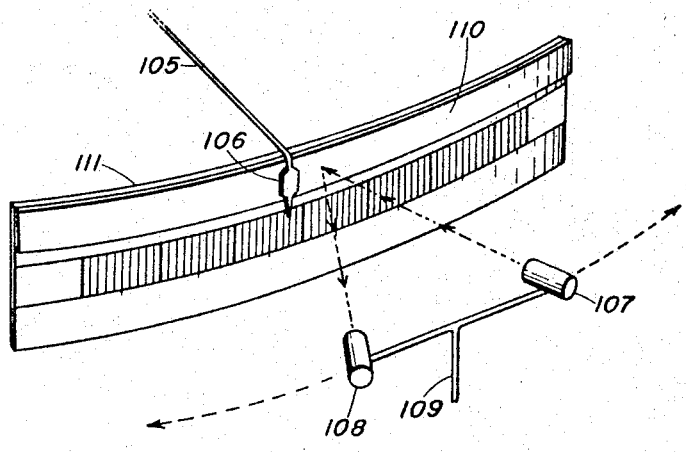

FIGURE 10 shows a modified form of the invention suitable for use in conjunction with existing control apparatus or in other special situations. In this case, the needle or pointer arm 105 is provided with an enlarged end 106 which acts as the shield. A pair of switching members includes the light source 107 and the photodiode 108 mutually supported on the adjustable frame 109 and directed inwardly to line up with the curved surface 110 on the front of the scale 111. This surface 110 is reflective and upon the light being emitted from the unit 107 it is reflected from this surface into the diode 108 thus to activate. Interference with the light being from the light source 107 is caused by the flag 106 covering the reflected surface 110 thus deactivating the diode 108, thereby to control the circuit. Any suitable holding relay (not shown) may be utilized to hold the required circuit in and the circuit can be broken by a second passage of the pointer or broken after a timed interval as required for the particular control condition.

Figure 11:
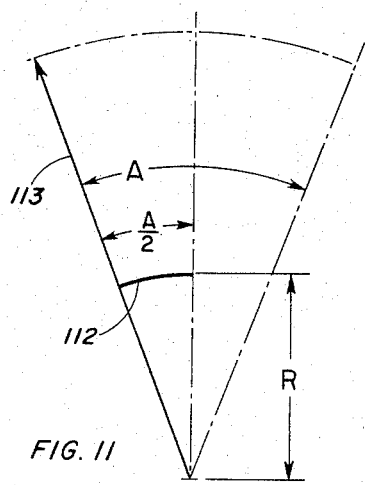
FIGURES 3 to 11 show alternative embodiments of the invention.

With reference to FIGURE 11 the use of the flag as illustrated in FIGURE 4 is explained in further detail. The mask 112 supported on the pointer arm 113 is adapted to swing through an arc having a radius R. The total movement of the pointer arm 113 is equal to A and the actual arcuate length of the mask 112 is equal to (A/2—). The minus portion of the dimension represents the space required for the mask to clear the photocell and provide sufficient passage of light thereto in order to activate the same. The distance A represents the total angular movement in degrees of the pointer arm 113. The setting arm movement in degrees which is A/2 is greater than the arcuate length in degrees of the mask 112, which is equal to (A/2—).

It will thus be seen that the invention provides an instrument which may be adapted to suit many different control functions and applications with a minimum of redesigning and utilizing a larger number of interchangeable units, more or less of which may be associated together in any particular situation to perform the desired operation.

At the same time the instrument of the invention is essentially a relatively simple, rugged unit incorporating improved safety features by reason of the fact that the circuit of FIGURE 2, and its alternative embodiments will in most cases fail safe. Thus failure of a photodiode, a transistor, or a relay winding will in almost all cases ensure that the instrument is in the "off" condition, as if no light were falling on photodiodes 31, and no current will pass. The possibility of mechanical failure, such as damage to mask member 17 is remote since it is not in contact with another part of the mechanism except the galvanometer arm 12. Furthermore in the embodiment of FIGURE 1 mask member 17 will still be available to operate at a somewhat higher temperature. The possibility of failure of the galvanometer 10 itself or the thermocouple (not shown) is present in the majority of such instruments but will normally be apparent from the face of the instrument and is in most cases protected against by burn-out protection circuits of known design.

The foregoing is a description of a preferred embodiment of the invention which is here made by way of example only. It is not intended that the invention should be limited to the apparatus described but comprehends all such variations as come within the spirit and scope of the appended claims.

What is claimed is:

1. Condition responsive automatic control apparatus comprising: a transducer connectable to be responsive to variations in said condition; a pointer arm swingable in an arcuate path in response to said variations; mask means mounted on said pointer arm for movement therewith; a movable arm mounted for movement in an arc concentric with said arcuate path of said pointer arm, said arc having an angular length in degrees approximating the angular length of said arcuate path; a first photosensitive switch mounted rigidly on said arm; a second photosensitive switch secured adjustably to said arm; both of said photosensitive switches being positioned within the path of said mask member for operation thereby; first control switching means responsive to said first photosensitive switch for operation thereby to exercise control upon said condition; second control switching means responsive to said second photosensitive switch for operation thereby to exercise control upon said condition; and means for adjusting said second switch relative to said first switch, thereby to vary the spacing therebetween to obtain differential control of said condition.

2. Apparatus as claimed in claim 1, in which said movable arm is moved relative to the remainder of the apparatus by a device comprising: an operator member having a pivotal mounting on said remainder of said apparatus; guide means on said operator member slidably engaging slot means on said movable arm for movement therealong; and a manually operable flexible shaft threadedly secured to said operator member, whereby rotation of said shaft causes said operator member to pivot about said pivotal mounting, and said guide means is caused to travel along said slot means, thereby causing movement of said movable arm.

3. Apparatus as claimed in claim 1, in which said mask means is of an arcuate length substending at its center an angle equal in degrees to said arc of movement of said movable arm less the effective width of said photosensitive switch.

4. Condition responsive automatic control apparatus comprising: a transducer connectable to be responsive to variations in said condition; a pointer arm swingable in an arcuate path in response to said variations; a scale over which said pointer arm is adapted to swing; photosensitive means comprising a light source and a light sensitive receptor; a reflector on said scale oriented to reflect light from said light source to said receptor, mask means mounted on said pointer arm whereby upon said pointer swinging over said scale mask means will momentarily interrupt reflection of light by said reflector; and control switching means operable to control said condition responsive to an interruption of light received by said receptor.

5. Condition responsive automatic control apparatus comprising, in combination, a transducer connectable to be responsive to variations in a selected condition, said transducer including an indicator mounted for swinging movement about a pivot axis in response to variations in said selected condition and including a first pointer extending from said axis and swingable in an arcuate path along an arcuate scale; at least one arcuately extending mask mounted on said indicator and swingable in an arcuate path upon swinging of said indicator; at least one arm mounted for adjustment about an axis coaxial with the pivot axis of said indicator; each arm including an arm portion extending from said pivot axis and having a second pointer at its free end cooperable with said scale; at least one photosensitive switch adjustably mounted on at least one of said arms for adjustment thereon, and positioned within the arcuate path of movement of said mask; said photosensitive switch comprising a photosenitive element and a light source having a light emitting surface in adjacent facing spaced relation to said photosensitive element, for movement of said mask therebetween; control switching means responsive to said photosensitive switch for operation thereby in accordance with the relative position of said mask relative to the associated photosensitive switch; and adjusting means connected to each of said arms and projecting forwardly from said scale for selective adjustment of said second pointer of each arm relative to said scale.

References Cited

UNITED STATES PATENTS

| | | | |
|---|---|---|---|
| 2,236,255 | 3/1941 | Young | 250—231 |
| 2,715,707 | 8/1955 | Haskins | 250—237 X |
| 3,028,503 | 4/1962 | Stevenson | 250—231 |
| 3,054,928 | 9/1962 | Schrenk et al. | 250—231 X |
| 3,082,328 | 3/1963 | Mohring | 250—231 |
| 3,118,087 | 1/1964 | Eisenberg | 250—231 X |
| 3,162,789 | 12/1964 | Schlaich | 250—231 X |

WALTER STOLWEIN, *Primary Examiner.*